United States Patent [19]

Newman et al.

[11] Patent Number: 4,659,412

[45] Date of Patent: Apr. 21, 1987

[54] METHOD FOR ADHERING A COATING MATERIAL TO DENSIFIED RANDOM-FIBER COMPOSITE SHEET

[75] Inventors: Ritchey O. Newman, Midland, Mich.; Steven E. Finlayson, Granville, Ohio

[73] Assignee: The Dow Chemical Company, Midland, Mich.

[21] Appl. No.: 663,601

[22] Filed: Oct. 22, 1984

[51] Int. Cl.$^4$ .............................................. B32B 31/12
[52] U.S. Cl. .................... 156/322; 138/143; 138/146; 427/316; 428/86; 428/290; 428/291
[58] Field of Search .............. 138/143, 146, 149, 145; 156/82, 320, 322, 321; 162/135; 427/316; 428/86, 290, 291

[56] References Cited

U.S. PATENT DOCUMENTS

| | | | |
|---|---|---|---|
| 2,721,144 | 10/1955 | Penley | 427/316 |
| 3,227,603 | 1/1966 | Kraiman | 156/321 X |
| 3,757,829 | 9/1973 | Berry et al. | 138/146 |
| 3,868,433 | 2/1975 | Bartz et al. | 156/327 X |
| 4,186,043 | 1/1980 | Zeigler et al. | 156/322 X |
| 4,384,083 | 5/1983 | Baker | 156/331.7 X |
| 4,426,470 | 1/1984 | Wessling et al. | 162/135 X |

Primary Examiner—Robert A. Dawson

[57] ABSTRACT

A method for adhering a coating material to at least one surface of a densified random-fiber composite sheet is provided. The method comprises applying sufficient heat to a surface of the composite sheet to form an activated surface whereby the fiber component of the sheet is projected outward from a plane defined by that surface, and contacting the activated surface with the coating material. The coating material is generally of a viscous or liquid nature such that it can physically interact with the projected fibers to adhere thereto. A method for adhering asphalt to a metal substrate employing a densified random-fiber composite sheet is also provided wherein the metal is coated with an adhesive and then adhered to an activated surface of a composite sheet. Asphalt is then coated onto the exposed surface of the composite sheet which has been activated or is activated by coating with hot asphalt.

18 Claims, No Drawings

METHOD FOR ADHERING A COATING MATERIAL TO DENSIFIED RANDOM-FIBER COMPOSITE SHEET

BACKGROUND OF THE INVENTION

The present invention is directed toward a method for adhering a material to coat at least one surface of a densified random-fiber composite sheet. The method provides for a fibrous surface to which coating materials can physically interact to firmly bond thereto. More specifically, the fibers present in the composite sheet are caused to project outward from the plane defined by the surface of the sheet to form an activated surface. The fibers are activated by heating said surface either prior to or simultaneously with the application of the coating material.

Generally, densified random-fiber composite sheets are prepared from fibrous reinforcement materials, binders and a heat-fusible organic polymer. These polymeric composite sheets exhibit the excellent properties of the polymer from which they are designed plus increased physical properties (see generally, U.S. Pat. No. 4,426,470). While the polymeric composites exhibit excellent properties it can be difficult to adhere other materials to the polymeric surface of the composite sheet. Thus, a method for adhering other materials to random-fiber composite sheets is very desirable.

It has been discovered that predensified random-fiber composite sheets (hereinafter "composite sheet") can be treated such that they offer an excellent surface to which coating materials can physically interact to form excellent bonds. This method therefore allows composite sheets to be employed in a wide range of applications heretobefore deemed to be quite difficult. Additionally, the subject method allows various adhesive coating materials to be employed with composite sheets to more fully utilize the potential of composite sheets.

SUMMARY OF THE INVENTION

In one aspect, the present invention is a method for adhering a coating material to at least one surface of a densified random-fiber composite sheet which comprises applying sufficient heat to the surface to form an activated surface whereby the fiber component of the sheet is projected outward from a plane defined by the surface and contacting a coating material to the activated surface whereby the coating material can physically interact with the projected fibers to adhere thereto. The step of applying sufficient heat to the composite sheet can be made prior to contacting the coating material or applied simultaneously with the contacting of the coating material. The densified random-fiber composite sheet of the subject invention generally has reinforcing fiber present from about 10 to about 80 percent by weight of the composite sheet. The average length of the reinforcing fibers is from about 3 to about 25 mm in length. The preferred reinforcing fibers are glass fibers.

In another aspect, the method of the subject invention can include the additional step of adhering the surface coated densified random-fiber composite sheet to a substrate where an adhesive is the coating material. Generally, the adhesive is a thermoplastic material such as ethylene acrylic acid. The adhesive can also be a reactive polymer such as an epoxy, phenolic, urethane or nylon adhesive. The substrate can be any number of materials such metal, wood, or polymer.

In one particular aspect, the present invention can be a method for adhering asphalt to a metal substrate comprising the steps of adhering an adhesive to the surface of the metal substrate and either simultaneously or subsequently adhering an activated surface of a densified random-fiber composite sheet to the adhesive and contacting the exposed surface of the densified random-fiber composite sheet with a hot asphalt such that the exposed surface is activated whereby the asphalt physically interacts with the activated surface to adhere thereto. Generally, the metal substrate can be a steel culvert or pipe where the steel culvert is preheated prior to the step of adhering an adhesive to the surface of the culvert or pipe. The adhesive can be ethylene acrylic acid. Generally, the step of contacting the exposed surface of the densified random-fiber composite sheet with a hot asphalt is conducted by dipping the exposed surface of the densified random-fiber composite sheet into hot asphalt.

The present invention generally provides for a method for coating a densified random-fiber composite sheet with any number of suitable coating materials which can interact with the activated surface of the densified random-fiber composite sheet. This basic system can then be combined with any number of substrates to form laminates thereof.

DETAILED DESCRIPTION OF THE INVENTION

In one aspect, the method for adhering a coating material to a densified random-fiber composite sheet contemplates heat treating at least one surface of the sheet to create a surface having fibers projecting therefrom (hereinafter referred to as an "activated surface"). The term "projecting", so used herein, refers to fibers which have a portion of their length embedded in, or locked in, the organic polymer of the sheet and a portion of their length not embedded in, but sticking out from, the surface of said sheet. This activated surface can then be coated with a desired coating material which is capable of flowing around the projected fibers to effectively anchor it to the composite sheet. In other words, the fibers form a mechanical interlock between the random fiber composite sheet and the coating material. The laminate (coating material/composite sheet) can then be utilized in any number of ways. For example, where the coating material is an adhesive resin the laminate can be adhered to a substrate such as metal, wood, or polymeric material to leave an exposed surface of the polymeric composite sheet. Thus, the substrate would have a polymeric surface possessing the properties of the densified random-fiber composite sheet.

In another aspect of the subject method, the laminate (coating material/composite sheet), as described above, can be adhered to a substrate and the exposed composite sheet surface heat treated to form an activated surface. This new activated surface can then be coated with an additional coating material.

In yet a further aspect of the subject method, the methods described above can be repeated over and over to obtain a plurality of composite sheets laminated with various coating materials and/or bonded to various substrates.

The random-fiber composite sheets employed in the subject method are generally described in U.S. Pat. No.

4,426,470, herein incorporated by reference. U.S. Pat. No. 4,426,470 discloses a method for preparing said composite sheet and in particular discloses a predensified sheet which is pressed with a calender or nip roll after drying the composite to provide a sheet having increased tensile and tear strength. Other forms of densified composite sheets are applicable to this method and are disclosed in the art as polymeric composites, fiber-reinforced polymeric sheets (U.S. Pat. No. 4,431,696), plastic composites and fiber mats. The particular method of forming the composite sheet is not critical provided a densified composite sheet is produced. Although the density of a particular sheet will depend on the individual thermoplastic resin and reinforcing fibers employed a typical densified random-fiber composite sheet containing a polyolefin matrix and glass fibers would have a density from about 15–110 pounds/cubic foot (0.24 to 1.76 g/cc) preferably 15–100 pounds/cubic foot (0.24 to 1.60 g/cc).

In general, the random-fiber composite sheet will comprise a heat fusible resin into which a reinforcing fiber can be incorporated. In addition, the composite sheet may contain other additives such as cellulose, latex binders, inorganic pigments, antioxidants, flocculants and other ingredients.

More critical to the subject method is the presence of reinforcement fibers in the composite sheet. Generally, the reinforcement fibers are described as being either organic or inorganic products such as graphite, metal, ceramic, polyamides, aromatic polymers, polyester, cellulose and glass. Glass fibers are the preferred choice for most applications due to their strength and low cost; however, specialized applications may make other fiber not herein disclosed more suitable. The particular compositional identity of the fiber is not deemed to be critical to the subject method and the skilled artisan may find any number of fibers to perform equally well.

The reinforcing fibers are essentially uniformly dispersed throughout the resinous matrix and are randomly oriented in a plane defined by the composite, i.e., there is substantially no alignment of the fibers in any particular direction within said plane. The fibers employed have an average length of from about 0.125 to about 1.00 inch (3–25 mm), preferably from about 0.18 to about 0.5 inches (4–12 mm). Additionally, the fibers have an aspect ratio (length to diameter ratio) of from about 40 to more preferably 100. Generally, the reinforcement fiber is present in the composite sheet from about 10 to about 80 percent by weight of the composite sheet, preferably from about 15 to about 40 percent by weight of the composite sheet.

Generally, the subject method entails heat-treating at least one surface of the densified random-fiber composite sheet whereby the fibers present at the surface are caused to project outward from a plane defined by that surface, i.e., form an activated surface. The projected fibers thereby allow a coating material which is of sufficient viscosity to flow around the projected fibers and thus, physically interact to lock-on or anchor to the fibers and, accordingly, the composite sheet. The projected fibers of the composite sheet therefore create physical proturbances which increase the surface area of the sheet and link the composite sheet to the coating material.

In one case the composite sheet can be heat-treated on only one surface while maintaining the other surface at a cooler temperature. This would create an activated surface on one side and maintain the original smooth polymeric surface on the other side. Once the composite fibers have been bonded to another material that surface is essentially deactivated. Upon reheating, the remaining surface can be activated for bonding to another and possibly different material.

Generally, the heat necessary to activate the surface is at about the softening point of the particular polymeric matrix employed in the composite sheet. Further, the heat applied to the surface of the composite sheet should not be so excessive that it degrades the polymer. The degradation of the polymer component of the composite sheet is of course a function of various parameters of the heating operation such as temperature and residence time. Therefore, the temperature may exceed the tolerance of the polymer provided residence time is short. The heat can be applied by any one of many methods such as by blown air, a heated press, infrared (radiant) heaters, hot rolls, or liquid bath. In one preferred method, the heat treatment is performed by employing a heated coating material which is applied to one surface of the composite sheet. In this method, the fibers are simultaneously projected into the coating material to be adhered as the coating is applied.

The heat treatment of the surface of the random-fiber composite sheet causes the polymeric binder to soften and release at least a portion of the random-fiber dispersion. It is believed that the softening of the polymer present on the surface contributes to releasing fibers which are under a state of stress. This stress is due to the densification Process of the composite sheet which tends to cause the fibers to bend slightly where they overlap. Therefore, the stressed fibers have a tendancy to straighten or relax when the polymeric binder is softened.

The coating compositions or materials which can be employed for adhering to the activated surface of the densified random-fiber composite sheet are those which are capable of physically interacting with the projected fibers of the activated surface. Physically interacting with the projected fibers is meant to describe the coating material's ability to penetrate or flow into the interstices created by the projected fibers. Suitable coatings are generally of a viscous or liguid nature; however, coatings which can be made temporarily viscous by solvents or temperature can also be advantageously employed. Common examples would comprise cements such as plaster or concrete; adhesives; pressure sensitive adhesives; polymeric materials such as polyvinyl chloride plastisols, epoxies, urethanes, ethylene acrylic acid; polyolefins such as polyethylene, polypropylene, nylons, polystyrene polyester, phenolics, acrylics; paints such as polyesters, latexes, silicone, polyesters, alkyd, acrylic latexes, etc.; other resinous and thermoplastic material; greases, waxes, asphalt, tar and oil products. Other coating material which can physically interact with the projected fibers, i.e., activated surface, should be readily recognized by the skilled artisan and are deemed to be within the scope of this invention.

In one aspect, the subject method can be employed by activating one surface of a densified composite sheet and coating a thermoplastic adhesive such as ethylene acrylic acid or a reactive adhesive such as an epoxy, phenolic, urethane or nylon adhesive thereto. The adhesive surface can then be bonded to a substrate material to form a polymeric surface consisting of the unactivated surface of the densified composite sheet on the substrate. Typical substrates can be wood, metal, polymeric materials or articles of manufacture such as carpet, linoleum, tile, fabric and the like.

An example of the foregoing application would be to coat one or both sides of plywood with a polymeric composite by employing an appropriate adhesive. Since the unactivated surface of the polymeric composite exhibits little tendency to adhere to other materials an excellent release surface is created on the plywood or other substrate employed. This characteristic can be especially valuable in the preparation of forms for cement or other similar applications.

In another application, a sheet of steel may be preheated to approximately 400° F. (204° C.) and as the heated steel exits an oven a 0.5 to 40 mil, preferably 2-12 mil, film of ethylene acrylic acid (EAA) and densified composite sheet is applied. The heat of the steel substrate thus effectively bonds both the EAA and composite sheet. The laminated steel can now be formed into a desired shape and cooled or first cooled and then shaped. Optionally, a nip roll can be employed to apply pressure to the laminated substrate to further assure bonding of the adhesive and composite sheet. In addition, the laminate can be dipped into a hot coating material such as asphalt to effectively activate the exposed composite sheet surface and adhere the asphalt.

In another aspect, the subject method can be employed to coat coil or plate steel with a thermoplastic adhesive and composite sheet wherein the composite is bonded to the steel via the activation process or thru material affinity. Once bonded, the laminate unit can be extensively formed into complex three dimensional objects such as automobile underbodies, wheel wells, corrugated pipes and panels, drums, tanks or other useful articles. Optionally, the formed article can be subjected to another heat process to activate the outer exposed surface which can then be coated with a desired coating material or the article can be dipped into a hot coating material.

Optionally, it can be beneficial to first coat the substrate material prior to lamination with a primer coat to further increase bond strength of the adhesive. Such preparations can be beneficial to increase the corrosion resistance of the substrate.

A further application can comprise applying the composite sheet to a metal surface precoated with an asphalt or tar material wherein the asphalt or tar serves as the bonding layer. The composite sheet can either have a pre-activated surface for the asphalt or tar to bond to or the composite sheet can be activated in situ by applying the composite when the precoated asphalt or tar is hot.

Other applications for the activated composite sheet of the subject invention, which are apparent to those skilled in the art, are deemed to be within the scope of this invention. The following examples are provided to more fully illustrate the potential of the subject method.

EXAMPLE I

A 0.1 inch thick specimen of undensified composite sheet (s.g. 0.2) made with high density polyethylene powder and 35.2 percent glass fiber was heated on one side to 200° C. for 3 minutes under 300 psi while maintaining the other side at room temperature. After release of pressure, the heated side (activated surface) showed evidence of projected fibers while the unheated side remained a solid surface.

An epoxy adhesive was applied to the activated surface and adhered to plywood.

EXAMPLE II

A 0.1 inch thick specimen (s.g. 0.2) formed from two undensified composite sheets laid one on top of the other were molded together and densified to 0.016 inches thick with a specific gravity of approximately 1.25 by heating to 170° C. under 300 psi pressure in a press for 4 minutes and then allowed to cool under pressure. One side of the densified specimen was then passed under a hot air gun while the other side was cooled. The side exposed to the hot air gun was observed to have a "fuzzy" appearance indicating projected fibers. This surface was adhered to a plywood substrate with epoxy and exhibited excellent adhesion.

EXAMPLE III

Coating of Galvanized Steel with Asphalt

Samples of galvanized steel were laminated with an adhesive film of ethylene acrylic acid resin (EAA) (a 2 mil, a 5 mil, and a 12 mil film) and a densified polymeric composite sheet 8-12 mil in thickness having 30 percent glass fiber content. The samples were then dipped into 204° C. (400° F.) asphalt for 30-360 seconds. The samples were cooled and the asphalt was observed to cause the composite to become coarse and fibrous on the exposed surface which indicates activation. Furthermore, the asphalt was observed to be bonded to the composite without a loss of adhesion of the composite to the galvanized steel.

The prepared samples were then subjected to a 180° C. peel strength test. The samples prepared with a 2 mil film of EAA could not be pulled from the steel substrate which indicates a bond strength in excess of 40 pounds per one inch width. The samples prepared with a 5 mil film of EAA showed a peel strength of 31 pounds per one inch width with failure occurring in the EAA film.

EXAMPLE IV

A galvanized steel sample was heated to 204° C. (400° F.) and coated with a 2 mil film of EAA and a 30 percent glass fiber content 16 mil undensified (lofted) composite sheet. The preheated metal was the source of heat for the lamination and fusion of the EAA film and composite sheet. The EAA film and composite sheet were sufficiently bonded to the steel such that they were destroyed when attempted to be peeled off.

Additional samples similarly prepared were dipped into asphalt at 204° C. (400° F.) and excellent penetration of the asphalt into the composite sheet was achieved. The asphalt bond to the composite sheet was excellent. The 180° C. peel strength of all samples was about 4 to 5 pounds per one inch width which was the structural strength of the 30 percent glass fiber content undensified composite sheet.

What is claimed is:

1. A method for adhering a coating material to at least one surface of a densitifed random-fiber composite sheet, said sheet being prepared from fibrous reinforcement materials, binders and a heat-fusible organic polymer, which comprises applying sufficient heat to said surface to cause the heat-fusible organic polymer to soften and releases at least a portion of the length of fibrous materials present at the surface of said sheet whereby said portion of the fibrous component of said sheet projects outward from a plane defined by said surface, and contacting said surface with a coating material of sufficient viscosity to flow around said projected portion of the fibrous component and physically interact to anchor to the projected fibrous component.

2. The method of claim 1 wherein said step of applying sufficient heat is made prior to contacting said coating material.

3. The method of claim 1 wherein said step of applying sufficient heat is made simultaneously with contacting said coating material.

4. The method of claim 3 wherein said coating material is sufficiently hot to cause the heat-fusible organic polymer to soften and release at least a portion of the length of fibrous materials present at the surface of said sheet.

5. The method of claim 1 wherein said densified random-fiber composite sheet has reinforcing fiber present from about 10 to about 80 percent by weight of said composite sheet.

6. The method of claim 5 wherein said reinforcing fibers have an average length of from about 3 to about 25 mm in length.

7. The method of claim 6 wherein said reinforcing fibers are glass fibers.

8. The method of claim 1 wherein the coating material is an adhesive and includes the additional step of adhering said densified random-fiber composite sheet to a substrate.

9. The method of claim 8 where said adhesive is a thermoplastic adhesive.

10. The method of claim 9 where said thermoplastic adhesive is ethylene acrylic acid.

11. The method of claim 8 wherein said adhesive is a reactive adhesive.

12. The method of claim 11 wherein said reactive adhesive is an epoxy, phenolic, urethane or nylon adhesive.

13. The method of claim 8 where said substrate is a metal, wood or polymeric material.

14. A method for adhering asphalt to a metal substrate comprising the steps of adhering an adhesive to the surface of said metal substrate and either simultaneously or subsequently adhering an activated surfasce of a densified random-fiber composite sheet, the sheet being prepared from fibrous reinforcement materials, binders and a heat-fusible organic polymer, to said adhesive, the activated surface being prepared by applying sufficient heat to a surface of the sheet to cause the heat-fusible organic polymer to soften and release at least a portion of the length of fibrous materials present at the surface of said sheet, said portion projecting outward from a plane defined by said surface, and contacting the exposed surface of said densified random-fiber composite sheet with hot asphalt such that said exposed surface is heated sufficiently to cause the heat-fusible organic polymer to soften and release at least a portion of the length of fibrous materials present at said exposed surface whereby said portion projects outward from a plane defined by the exposed surface and said asphalt flows around, and physically interacts with, said projected portion to adhere thereto.

15. The method of claim 14 where said metal substrate is a steel culvert or pipe.

16. The method of claim 15 where said steel culvert is preheated prior to said step of adhering an adhesive to the surface of said culvert or pipe.

17. The method of claim 16 where said adhesive comprises ethylene acrylic acid.

18. The method of claim 17 where the step of contacting the exposed surface of said densified random-fiber composite sheet with hot asphalt is conducted by dipping into hot asphalt.

* * * * *